(12) United States Patent
Dobberphul et al.

(10) Patent No.: US 11,312,413 B2
(45) Date of Patent: Apr. 26, 2022

(54) OPERATING METHOD FOR A STEER-BY-WIRE STEERING SYSTEM, CONTROL UNIT FOR A STEER-BY-WIRE STEERING SYSTEM, STEER-BY-WIRE STEERING SYSTEM, AND TRANSPORTATION VEHICLE

(71) Applicant: VOLKSWAGEN AKTIENGESELLSCHAFT, Wolfsburg (DE)

(72) Inventors: Timo Dobberphul, Braunschweig (DE); Christopher Kreis, Braunschweig (DE); Tobias Rüger, Braunschweig (DE)

(73) Assignee: Volkswagen Aktiengesellschaft

( * ) Notice: Subject to any disclaimer, the term of this patent is extended or adjusted under 35 U.S.C. 154(b) by 281 days.

(21) Appl. No.: 16/489,524

(22) PCT Filed: Jan. 16, 2018

(86) PCT No.: PCT/EP2018/051021
§ 371 (c)(1),
(2) Date: Aug. 28, 2019

(87) PCT Pub. No.: WO2018/157989
PCT Pub. Date: Sep. 7, 2018

(65) Prior Publication Data
US 2021/0284230 A1 Sep. 16, 2021

(30) Foreign Application Priority Data
Mar. 2, 2017 (DE) .................. 10 2017 203 456.4

(51) Int. Cl.
*B62D 6/00* (2006.01)
*B62D 15/02* (2006.01)
*B62D 5/04* (2006.01)

(52) U.S. Cl.
CPC ............. *B62D 6/002* (2013.01); *B62D 6/008* (2013.01); *B62D 15/02* (2013.01); *B62D 5/0463* (2013.01)

(58) Field of Classification Search
CPC ........ B62D 6/002; B62D 15/02; B62D 6/008; B62D 5/0463; B62D 6/00
(Continued)

(56) References Cited

U.S. PATENT DOCUMENTS 6,082,482 A * 7/2000 Kato ..................... B62D 6/008
180/402
6,474,436 B1 * 11/2002 Konigorski ............ B62D 5/006
180/402
(Continued)

FOREIGN PATENT DOCUMENTS

CN      1769122 A     5/2006
CN    101357648 A     2/2009
(Continued)

OTHER PUBLICATIONS

Office Action for Chinese Patent Application No. 201880015379; dated Apr. 15, 2021.
(Continued)

*Primary Examiner* — Shardul D Patel
(74) *Attorney, Agent, or Firm* — Barnes & Thornburg LLP

(57) ABSTRACT

An operating method for a steer-by-wire steering system having a steering gear module, a steering wheel module, and a bus connecting the steering gear module and the steering wheel module, wherein an actual position in the steering gear module is sensed and a setpoint position in the steering wheel module is adjusted in relation to the actual position in the steering gear module by using an association specification. Also disclosed is a control unit for a steer-by-wire (Continued)

steering system, a steer-by-wire steering system, and a transportation vehicle having a steer-by-wire steering system.

9 Claims, 3 Drawing Sheets

(58) Field of Classification Search
USPC .......................................................... 701/41
See application file for complete search history.

(56) References Cited

U.S. PATENT DOCUMENTS

| | | | |
|---|---|---|---|
| 7,092,805 | B2 | 8/2006 | Kasahara et al. |
| 9,828,022 | B2 | 11/2017 | Pyo |
| 10,661,823 | B2* | 5/2020 | Delmarco .............. B62D 5/005 |
| 2009/0048738 | A1* | 2/2009 | Iwazaki ................ B62D 15/025 |
| | | | 701/44 |
| 2014/0200770 | A1* | 7/2014 | Bahena ................ B62D 15/024 |
| | | | 701/41 |
| 2015/0259007 | A1* | 9/2015 | Di Cairano .......... B62D 15/025 |
| | | | 701/41 |
| 2017/0090444 | A1* | 3/2017 | Takahashi ............ G05B 13/024 |
| 2017/0320516 | A1* | 11/2017 | Kashi .................... B62D 6/008 |

FOREIGN PATENT DOCUMENTS

| | | |
|---|---|---|
| CN | 201610171 U | 10/2010 |
| CN | 105818855 A | 8/2016 |
| DE | 19806458 A1 | 8/1998 |
| DE | 19842066 A1 | 3/2000 |
| DE | 10204955 A1 | 8/2002 |
| DE | 10205632 A1 | 10/2002 |
| DE | 10216247 A1 | 11/2003 |
| DE | 102015204332 A1 | 9/2015 |
| DE | 102014208786 A1 | 11/2015 |
| DE | 102014117718 A1 | 6/2016 |
| EP | 0974507 A2 | 1/2000 |
| EP | 2660126 A2 | 11/2013 |
| WO | 2010136892 A1 | 12/2010 |

OTHER PUBLICATIONS

Search Report for International Patent Application No. PCT/EP2018/051021; dated Jun. 5, 2018.

* cited by examiner

OPERATING METHOD FOR A STEER-BY-WIRE STEERING SYSTEM, CONTROL UNIT FOR A STEER-BY-WIRE STEERING SYSTEM, STEER-BY-WIRE STEERING SYSTEM, AND TRANSPORTATION VEHICLE

PRIORITY CLAIM

This patent application is a U.S. National Phase of International Patent Application No. PCT/EP2018/051021, filed 16 Jan. 2018, which claims priority to German Patent Application No. 10 2017 203 456.4, filed 2 Mar. 2017, the disclosures of which are incorporated herein by reference in their entireties.

SUMMARY

Illustrative embodiments relate to an operating method for a steer-by-wire steering system, to a control unit for a steer-by-wire steering system, to a steer-by-wire steering system as such and to a transportation vehicle which is embodied with a steer-by-wire steering system.

BRIEF DESCRIPTION OF THE DRAWINGS

Disclosed embodiments are described with reference to the figures, in which.

DETAILED DESCRIPTION

Figure 1:
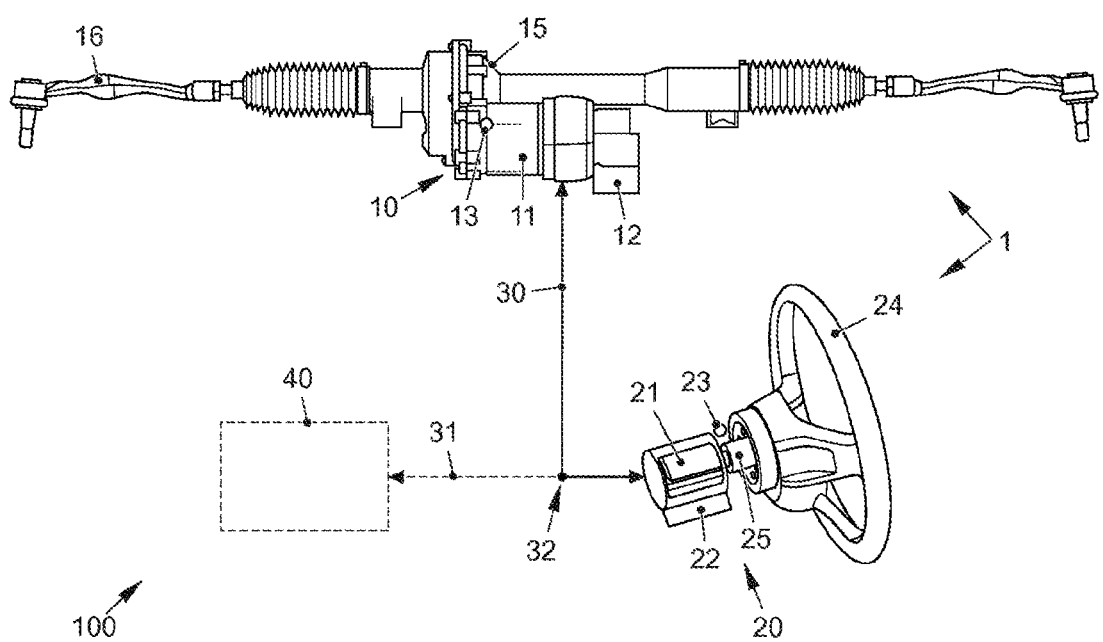
FIG. 1 shows a schematic view of exemplary embodiment of the disclosed transportation vehicle using an exemplary embodiment of the disclosed steering system.

In transportation vehicle technology, steering assist systems and/or steering assistance systems are being increasingly used in which there is not continuous and direct mechanical connection between a steering wheel and a steering gear but rather in which these components are coupled via a pure signal path, whether this is implemented as a bus, that is to say in a line-bound state, or in a wireless state. Such systems are generally referred to as steer-by-wire steering systems.

The disclosed embodiment provide an operating method for a steer-by-wire steering system, a control unit for a steer-by-wire steering system, a steer-by-wire steering system as such and a transportation vehicle, in which, despite the absence of a continuous and direct mechanical connection of steering components, the direct coupling of the steering components with simple methods or mechanisms is simulated at least equivalently in terms of haptic feedback to the user, on the one hand, and in terms of direct implementation of a driver's request, on the other.

According to a first disclosed embodiment, an operating method for a steer-by-wire steering system having a steering gear module, a steering wheel module and a communication channel which connects them, in particular, having a bus, is provided, wherein in the operating method (i) an actual position in the steering gear module is sensed, and (ii) a setpoint position in the steering gear module is adjusted in relation to the actual position in the steering gear module using an assignment rule. In this way it is ensured that haptic feedback for the user to the steering wheel module can be formed as a function of the assignment rule, which haptic feedback simulates the known immediate and directly mechanical behaviors of a steering unit. Moreover, by setting the assignment rule it is possible to implement augmented possibilities for the haptic feedback to the user.

The driver's request may be sensed in the steering wheel module and/or conversely fed in the direction of the steering gear module for the actuation thereof.

In the text above and in the text below, a bus is considered quite generally to be a communication channel for transmitting signals between the components which are referred to, wherein in the narrower sense a line-bound communication bus can also always be meant.

According to an exemplary embodiment of the disclosed operating method, the actual position in the steering gear module and/or a signal which is representative thereof are transmitted as the first control signal to the steering wheel module via the bus. The transmitted signal can be used here for positioning in the steering wheel module, for the modeling of haptics and/or for actuating a drive which is provided in the steering wheel module.

In this context, the first control signal can be used directly or in a further-processed and/or derived form.

In another exemplary embodiment of the disclosed operating method, additionally or alternatively a deviation in position in the steering wheel module, which can also be sensed as a deviation in orientation or in angle, is sensed and subsequently a steering torque and/or a steering force are determined which act on a steering wheel of the steering wheel module. Additionally or alternatively, in this context the acquisition of the steering torque and/or of the steering force can also be based on measured values which are generated by a torque sensor.

In this case, by the inverted assignment rule, a second control signal for the steering gear module can additionally be determined from the acquired steering torque and/or the acquired steering force and can be transmitted to the steering gear module via the bus.

The sensing and transmission of the driver's request may always take place so that the steering gear module can be actuated. In this context, the sensing can additionally take place by an installed sensor, for example, by a torque sensor.

The second signal can be used for positioning and/or orientation in the steering gear module and/or for actuating a drive which is provided in the steering gear module according to the acquired steering torque or according to the acquired steering force.

In this context, the second control signal can be used directly or in a further-processed and/or derived form.

The steering torque and/or the steering force may be representative of a driver's manual torque or of a driver's manual force which are applied to a steering wheel of the steering wheel module by an operator during operation. By these measures the steering request of the driver is reliably sensed and modeled.

By the disclosed operating method, the signals which are transmitted between the steering gear module and the steering wheel module can be used in a flexible and versatile way, on the one hand, to adapt the haptic feedback to the user in a suitable way and/or, on the other hand, to adapt a steering action which is desired by the driver in a suitable way and implement it as an actual steering movement in the steering gear module.

For this purpose, it is beneficial if, according to another exemplary embodiment of the disclosed operating method, the assignment rule and/or the inverted assignment rule are representative of a controllable steering transmission ratio between the steering gear module and the steering wheel module.

If appropriate, in this context the assignment rules can be configured differently, specifically for a transmission from the steering wheel module to the steering gear module, on the one hand, and for a transmission from the steering gear module to the steering wheel module, on the other, to implement a particular steering situation and/or feedback situation. In such a case, there is therefore no strict inversion between the forward path and the return path during the signal transmission, instead in this case two assignment rules which are to be differentiated from one another are used.

Generally, the assignment rule and/or the inverted assignment rule—or the assignment rules which are to be differentiated from one another for the forward path and the return path of the signal transmission—implement, for example, in a representative state a controllable steering transmission ratio between the steering gear module and the steering wheel module.

According to a further exemplary embodiment, a control unit for a steer-by-wire steering system is provided. The steer-by-wire steering system is embodied with a steering gear module, a steering wheel module and a communication channel which connects them, in particular, with a bus. According to the disclosed embodiments, the control unit is configured to execute the disclosed operating method.

In addition, the present disclosure provides a steer-by-wire steering system as such. The system is embodied with a steering gear module, a steering wheel module and a communication channel which connects them, in particular, with a bus. Furthermore, the steer-by-wire steering system has a disclosed control unit.

Finally, the subject matter of the present disclosure is also a transportation vehicle which has at least one steerable wheel for locomotion, and an exemplary embodiment of the disclosed steer-by-wire steering system for steering the at least one steerable wheel.

Exemplary embodiments and the technical background are described in detail below with reference to FIGS. 1 to 3. Identical and equivalent as well identically or equivalently acting elements and components are denoted by the same reference symbol. The detailed description of the designated elements and components is not represented whenever it occurs.

The illustrated features and further properties can be isolated from one another in any desired form and combined with one another as desired without departing from the core of the disclosure.

FIG. 1 shows a schematic view of an exemplary embodiment of the transportation vehicle 100 using an exemplary embodiment of the steer-by-wire steering system 1.

The steer-by-wire steering system 1 according to FIG. 1 is composed, in its core, of a steering gear module 10 and a steering wheel module 20 which are connected to one another via a communication channel, such as a bus 30.

A superordinate control unit 40 can be optionally connected to a node 32 of the bus 30 via a branch 31 of the bus 30. However, this is not absolutely necessary, especially since if, as in the embodiment according to FIG. 1, both the steering gear module 10 and the steering wheel module 20 have a separate control unit 12 or 22.

Furthermore, a control unit 13 for sensing an actual position and/or actual orientation in the steering gear module 10 and with respect to the steering gear 15 and the steering element 16 as well as a drive 11 for a corresponding adjustment of the steering gear 15 and of the longitudinal element 16 are embodied on or in the steering gear module 10.

The steering wheel module 20 has a sensor unit 23 for sensing the position of the steering wheel shaft 25 in the sense of an actual orientation or actual position and a drive 21 for haptic feedback via the steering wheel 24.

The disclosed operating method is carried out for a steer-by-wire steering system 1 via the exchange of communication by the bus 30 as a communication channel, using the control units 12 and 22, if appropriate using the superordinate control unit 40.

The disclosed method comprises here, in particular, the sensing of an actual position on or in the steering gear module 10, the transmission of a corresponding first control signal to the steering wheel module 20 via the bus 30, and the adjustment of a setpoint position in the steering wheel module 20 in relation to the actual position in the steering gear module 10 using a specific assignment rule which communicates, in particular, the transmission of the haptic feedback to the user.

In addition, when a user acts on the steering wheel 24, a deviation in position is generated in the steering wheel module 20. These deviations in position, for example, in the sense of re-orientation of the steering wheel shaft 25, can be sensed according to the disclosure to determine, on the basis of the sensed deviations in position, a steering torque and/or a steering force which act on the steering wheel 24 of the steering module 20. On the basis of a corresponding assignment rule which can be inverted, for example, with respect to the assignment rule as described above for the haptics, a second control signal can be generated from the acquired steering torque and/or the acquired steering force and transmitted from the steering wheel module 20 via the bus 30 to the steering gear module 10 to bring about positioning there in the steering gear module 10 and, in particular, in the steering gear 15 thereof and the steering element 16.

Figure 2:
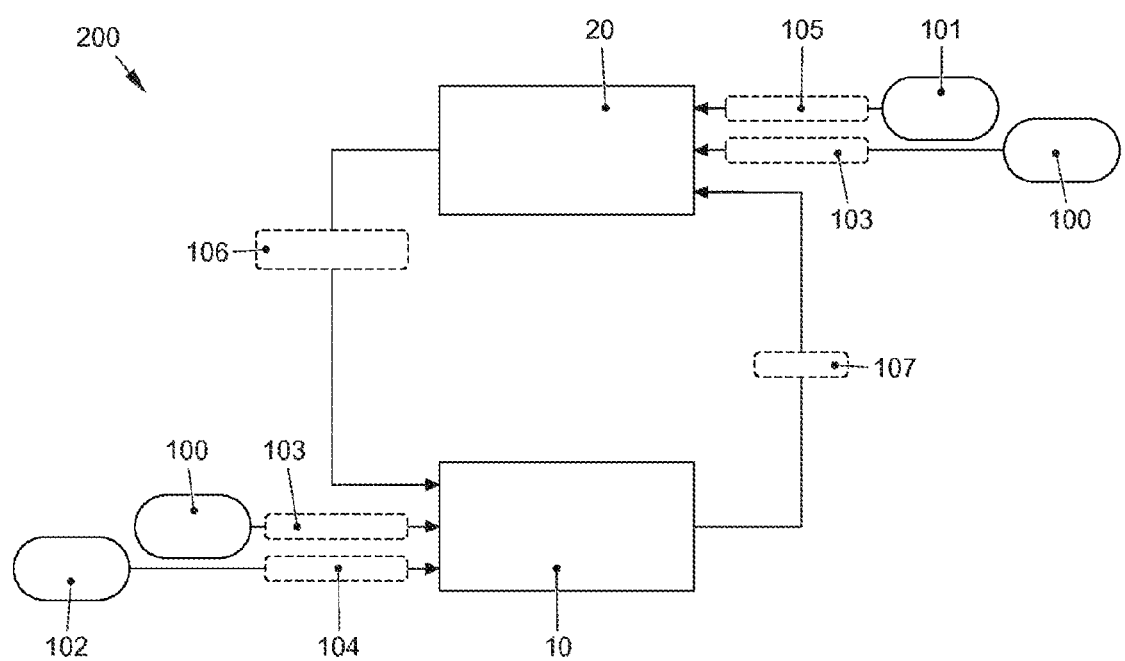
FIG. 2 shows a block diagram showing an overall control concept which can be used as the basis in an exemplary embodiment of the disclosed operating method.

FIG. 2 shows, in the manner of a block diagram, an overall control concept in the sense of an overall control method 200 which can be used as the basis for an exemplary embodiment of the disclosed operating method.

The overall control method 200 according to FIG. 2 is configured to control the interaction of the steering gear module 20 and of the steering wheel module 10.

On the steering gear module 10 side, the speed 103 of the transportation vehicle 100 and the interaction with roadway 104 in the sense of excitation or opposing force owing to the interaction with the roadway 102 are sensed, inter alia, as input parameters and fed in and evaluated, for example, in the control unit 12 of the steering gear module 10 and further processed, to feed an actual position 107 or actual orientation in relation to the steering gear module 10 or a signal representative thereof as a first control signal to the steering wheel module 20 via the bus 30.

This means, in other words, that the forces in question act on the steering gear module 10 and that the latter is possibly moved as a result thereof, wherein the movement is transmitted to the steering wheel module 20, as a result of which the driver receives, as it were, feedback from the road.

On the steering wheel module 20 side, a driver's manual torque 106 is calculated in the steering wheel module 20 on the basis of the first control signal and, in particular, the actual position 107 in the steering gear module 10 and, if appropriate, using the speed 103 of the transportation vehicle 100 and the derived manual torque 105 by the driver 101 and, for example, by the control unit 22 of the steering wheel module 20, and a signal which is representative thereof is generated as a second control signal and transmitted via the bus 30 to the steering gear module 10 to control the actual position or actual orientation 107 of the steering gear module 10 via the bus 30.

Figure 3:
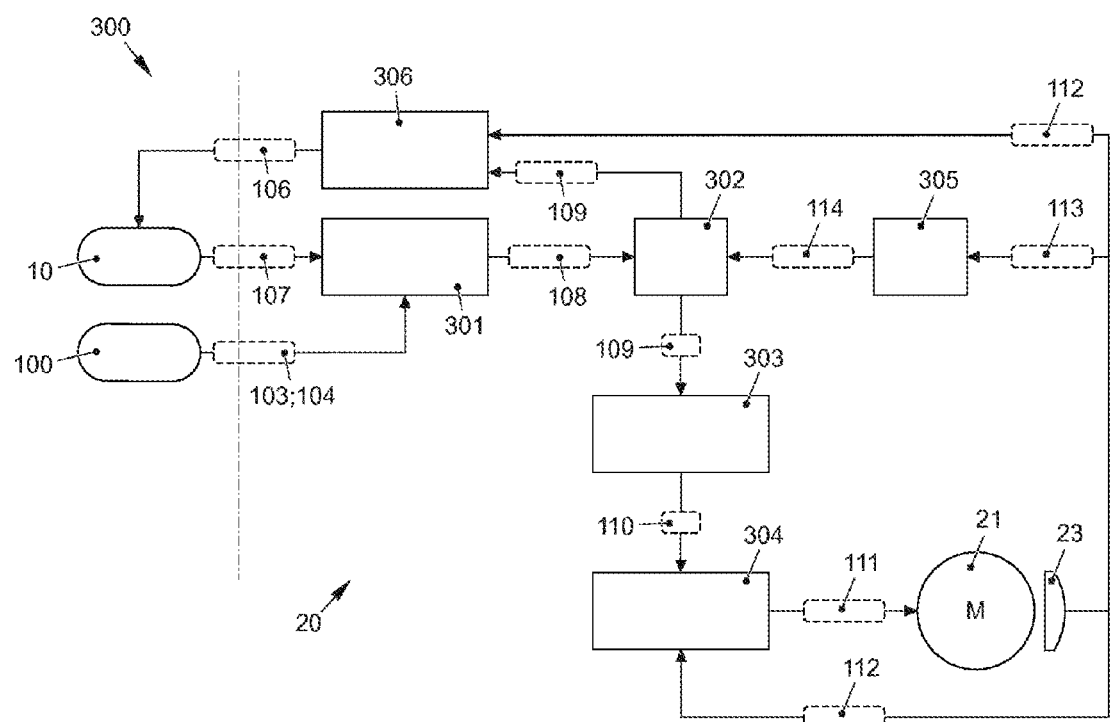
FIG. 3 shows a block diagram showing a control concept for a steering wheel module which can be used as the basis in an exemplary embodiment of the disclosed operating method.

FIG. 3 shows, in the manner of a block diagram, a control concept in the sense of a control method 300 for a steering wheel module 20 which can be used as the basis in the case of an exemplary embodiment of the disclosed operating method.

Serving as input parameters for the control method 300 for the steering wheel module 20 are, on the one hand, the actual position 107 with respect to the steering wheel module 10 or a signal which is representative thereof, for example, conceived of as a first control signal, and as parameters relating to the transportation vehicle speed 103 and a selected driving profile. These parameters are fed to a unit 301 for acquiring a setpoint steering angle 108, wherein the setpoint steering angle is determined, in particular, in relation to a characteristic curve which can be stored in a memory, wherein the characteristic curve establishes a relationship between the actual position or actual orientation and the value of the setpoint steering angle 108.

The setpoint steering angle 108 is fed at the same time to an actual steering angle 114 of a unit 302 for determining a control error, which unit 302 is configured to acquire an angular deviation 109.

The angular deviation 109 is fed to a unit 303 for controlling the motor torque, as the torque of the drive 21 of the steering wheel module 20, in order to define the motor torque 110 for the drive 21 of the steering wheel module 20 from the position control.

Under the effect of a downstream unit 304 for compensating the mass inertia, a setpoint torque can be derived from the motor torque 110 from the position control and fed to the drive 21 of the steering wheel module 20 as a control variable, wherein the change in rotor position 112 can also be input into the unit 304 for the compensation of the mass inertia.

The change in rotor position 112 results from a measuring process by the sensor unit 23 of the steering wheel module 20.

The change in rotor position 112 and, in particular, the rotor position 113 itself, which are acquired by the sensor unit 23, are fed to the unit 105 for calculating the steering angle, to calculate the actual steering angle 114 when the control circuit closes.

The change in rotor position 112 is fed, together with the angular deviation 109 from the unit 302 for determining the control error, to a unit 306 for calculating the manual torque 105 or the manual force 105.

The driver's manual torque 106 which is calculated in this way is fed from the steering wheel module 20 and, in particular, from the unit 306 directly or as a representative second control signal to the steering gear module 10 via the bus 30.

Alternatively or additionally, the driver's manual torque 106 and a corresponding force can be sensed by sensors which are provided, for example, torque sensors or the like.

The control circuit is therefore closed for the steering wheel module 20.

This and further features and properties of the present disclosure are explained in more detail by the following statements.

Steer-by-wire steering systems 1 for transportation vehicles 100 are constructed according to FIG. 1, inter alia, from a steering gear module 10 and a steering wheel module 20 which each have an electric motor 11, 21 and a control unit 12, 22 and are connected via a communication bus 30, if appropriate with intermediate connection of a superordinate control unit 40.

The steering capability and agility of the transportation vehicle 100 are determined by the performance of the steering gear module 10, the haptics for the driver are predefined by the steering wheel module 20.

To simulate the haptics and performance of conventional steering systems, that is to say ones which are connected mechanically, or even to improve the haptics and performance, according to the disclosure, inter alia, in particular, an intelligent sensor and control concept is proposed for application in the two components and in the data transmission between them.

Steer-by-wire steering systems 1 which are designed to sense the steering angle 114 in the steering wheel module 20 and, for example, to actuate a steering rack module of a steering gear 15 to a setpoint angle 108 are known.

In this context, the only limited adjustment capability of the haptics is problematic, with modeling of steering-column-based haptics with a mechanical transmission link between the steering wheel 24 and the steering gear 15 of a steering gear module 10 being impossible.

The disclosed embodiments relate, inter alia, to a steer-by-wire steering system 1 and, in particular, to a sensor and control concept on which such a system is based, for example, in conjunction with an operating method for a steer-by-wire steering system 1 with the focus on the communication between the steering wheel module 20 and the steering gear module 10. Both modules 10 and 20 are equipped with angle sensors 13 and 23. These can be, for example, multiturn counters, which measure in an absolute state, on the respective electric motor 11, 21 or else special sensors which sense the rotation of the steering wheel and the position of the steering rack.

The sensors 13, 23 may be used on the shaft of the respective electric motors 11, 21, since the latter can also be used for sensing the rotor position and for actuation.

The control concept which is proposed provides, for example, a two-stage control process:

Firstly, an actual position 107 of the steering gear module 10 is sensed and communicated to the steering wheel module 20 via the communication bus 30.

The steering wheel module 20 adjusts the position of the steering wheel module 20 according to a specific assignment rule which is prescribed, to an actual position 107, to be transmitted, of the steering gear module 10.

The assignment rule results from the desired and, in particular, parameterizable fixed or variable steering transmission ratio and, if appropriate, from further variables, e.g., from the transportation vehicle speed 103, a selection of the roadway, an off-road state or roadway state and, if appropriate, further variables and parameters which can be described individually or entirely in a parameter set 104.

Within the scope of the position controlled by the steering wheel module 20, a steering torque which is applied by the driver 101, as a manual torque or a manual force 105, is sensed and a driver's manual torque 106 is calculated and subsequently transmitted to the steering gear module 10.

With the calculated driver's manual torque 106 and, if appropriate, additional variables, e.g., a transportation vehicle speed 103, a driver profile selection, an off-road state and/or roadway state according to the parameter set 104, a setpoint force or a setpoint torque 111 is calculated, and is dimensioned and directed in such a way that it permits the manual torque 105 to be controlled and, in particular, to become zero.

This control circuit is illustrated with its control method 200 in FIG. 2.

For the calculation of the driver's manual torque 106, the angular deviation 109 is evaluated in the steering wheel module 20, the angular deviation occurring between the setpoint steering angle 108, which is calculated from the actual position 107 of the steering gear module 10, and the actual steering angle 114 of the steering wheel module 20.

The control process in the steering wheel module 20 may be configured in such a way that it applies only a limited control torque in a small steering angle range around the angle to be adjusted, the control torque typically rising in proportion to the angular deviation 109.

The driver 101 would counteract, with his manual torque 105, the adjusting torque of the steering wheel module 20, this would give rise to an angular deviation 109 at a corresponding level.

This angular deviation 109 can be converted into a manual torque 106 by the configuration of the control, specifically by determining or defining which motor torque 110 is applied at which deviation 109.

In addition, further variables such as a current acceleration and a speed of the steering wheel module 20 can be sensed, to be able to subtract torques resulting from inertias, latency times and hysteresis.

FIG. 3 illustrates a control process in the steering wheel module 20 with a corresponding control method 300.

The control within the steering gear module 10 is not illustrated in detail and can correspond in this respect essentially to known steering systems.

For the transmission of the signals—that is to say of the first and second control signals—in the communication bus 30 it may be possible to require that they are transmitted in a protected state, that is to say protected against falsification and redundantly, to ensure the fail safety.

The control process and the transmission of the control variables on the communication bus 30 can typically be implemented with a cycle time of 1 ms or less, to satisfy the haptic requirements.

The following embodiments are of essential significance, individually or in any desired combination with one another:

In the application it is possible to use a sensor concept which is based only on integrated rotor position sensors and does not require a further sensor system.

In addition it is possible to implement a control concept which ensures or even improves both the performance and the haptics of a conventional steering gear in the steer-by-wire steering system 1.

Moreover, alternatively or additionally it is possible to implement a data exchange between the steering wheel module 20 and the steering gear module 30, which exchange is based on the driver's manual torque 105 as a steering torque and on an actual position 107, for example, of steering racks.

In addition, freely parameterizable haptics can be implemented, specifically by configuring the control in the steering wheel module 20, in particular, by the relationship between the control torque and the angular deviation 109.

Instead of the configuration of the control with respect to a specific relationship between the angular deviation 109 and the motor torque 110, from which a driver's manual torque 106 can be calculated, it is also possible to use a torque sensor which directly senses or measures the driver's manual torque. This driver's manual torque 106 can then be fed into the control loop for the steering gear module 10.

In this exemplary embodiment there results a less complicated control algorithm which could operate more accurately because it always adjusts without an angular difference. With this configuration it is beneficial that there is the need for an additional sensor system which both entails additional costs and requires additional space and cannot be adjusted by parameters.

According to the disclosed embodiments, inter alia, the following benefits are obtained:

The need for a torque sensor is eliminated.

Adjustment haptics, for example, by a maximum manual torque, can be implemented.

An increase in the manual torque is obtained by an angular deviation 109.

The disclosed control in response to a driver's manual torque 106—and not as conventionally in response to a steering angle—permits a driver's request to be modeled more precisely or even accurately.

The performance and the haptics of a conventional steering system can be simulated and improved.

A control concept including the variables to be transmitted in a steer-by-wire steering system 1 are defined on the basis of the individual control circuits and the entire control loop.

The haptics for the driver 101 can be freely adjusted and controlled by parameters.

In contrast to known steer-by-wire control algorithms, with the disclosed procedure there is no attempt to subsequently calculate or model forces which really occur, to connect them artificially to the driver. Instead, the real forces are communicated directly, as they occur, as changes in position.

Even if the disclosure has been described in detail based on the exemplary embodiments explained in conjunction with the appended figures in the drawings, modifications and combinations of features of the presented exemplary embodiments are possible for a person skilled in the art without departing from the scope of the present disclosure, the scope of protection of which is defined by the appended claims.

LIST OF REFERENCE NUMERALS

1 Steer-by-wire steering system, steering system
10 Steering gear module
11 Electric drive, electric motor
12 Control unit
13 Sensor unit
15 Steering gear
16 Steering element
20 Steering wheel module
21 Electric drive, electric motor
22 Control unit
23 Sensor unit
24 Steering wheel
25 Steering wheel shaft
30 Bus, communication channel
31 Control branch
32 Node
40 (Superordinate) control unit
100 Transportation vehicle
101 Driver, user
102 Roadway
103 Speed 104 Interaction with roadway, excitation, opposing force, roadway state, charisma
105 Manual torque, manual force
106 Calculated driver's manual torque in the steering wheel module 20
107 Actual position in the steering gear module 10
108 Setpoint steering angle
109 Angular deviation
110 Motor torque from control of position
111 Setpoint torque
112 Change in rotor position
113 Rotor position
114 Actual steering angle
200 Control method for overall control of the steer-by-wire steering system 1
300 Control method for controlling the steering wheel module 10
301 Unit for determining setpoint angle
302 Unit for determining control error
303 Unit for controlling motor torque
304 Unit for compensating mass inertia
305 Unit for calculating steering angle
306 Unit for calculating manual torque

The invention claimed is:

1. An operating method for a steer-by-wire steering system of a transportation vehicle having a steering gear module, a steering wheel module and a communication channel which connects the steering gear module and the steering wheel module, wherein the method comprises:
sensing an actual position in the steering gear module, and
adjusting a setpoint position in the steering wheel module in relation to the actual position in the steering gear module using an assignment rule, wherein the assignment rule is derived from at least one of a driver profile selection and a roadway state.

2. The operating method of claim 1, further comprising transmitting the actual position in the steering gear module and/or a signal which is representative of the actual position in the steering gear module as a first control signal to the steering wheel module via a bus, for the positioning of the steering wheel module, for developing a haptic model and/or for actuating a drive provided in the steering wheel module.

3. The operating method of claim 1, further comprising determining a steering torque and/or a steering force which act on the steering wheel of the steering wheel module in response to a deviation in position in the steering wheel module and/or in response to a measured value of a torque sensor.

4. The operating method of claim 3, further comprising determining by the assignment rule, a second control signal for the steering gear module from the acquired steering torque and/or the acquired steering force; and
transmitting the second control signal to the steering gear module via a connecting bus, for the positioning thereof, for the actuation of a driver which is thereby provided in the steering gear module and/or in accordance with the acquired steering torque or in accordance with the acquired steering force.

5. The operating method of claim 4, wherein the steering torque or the steering force is representative of manual torque of a driver or of manual force of a driver of the transportation vehicle, which is applied to a steering wheel of the steering wheel module by an operator during operation.

6. The operating method of claim 1, wherein the assignment rule and/or an inverted assignment rule are representative of a controllable steering transmission ratio between the steering gear module and the steering wheel module.

7. A control unit for a steer-by-wire steering system, wherein the steer-by-wire steering system comprises a steering gear module, a steering wheel module and a communication channel which connects the steering gear module and the steering wheel module, and
wherein the control unit is configured to:
execute an operating method for the steer-by-wire steering system by sensing an actual position in the steering gear module, and adjusting a setpoint position in the steering wheel module in relation to the actual position in the steering gear module using an assignment rule, wherein the assignment rule is derived from at least one of a driver profile selection and a roadway state.

8. A steer-by-wire steering system comprising:
a steering gear module, the steering gear module configured with a variable gearset;
a steering wheel module;
a communication channel which connects the steering gear module and the steering wheel module and
a control unit for the steer-by-wire steering system, wherein the control unit executes an operating method for a steer-by-wire steering system that senses an actual position in the steering gear module, and adjusts a setpoint position in the steering wheel module in relation to the actual position in the steering gear module using an assignment rule, wherein the assignment rule is derived from at least one of a driver profile selection and a roadway state.

9. A transportation vehicle, comprising:
at least one steerable wheel for locomotion;
a steer-by-wire steering system for steering the at least one steerable wheel, the steer-by-wire steering system comprising a steering gear module, a steering wheel module and a communication channel which connects the steering gear module and the steering wheel module, the communication channel comprising a control unit and a connecting bus; and
wherein the control unit executes an operating method that includes sensing an actual position in the steering gear module, and adjusting a setpoint position in the steering wheel module in relation to the actual position in the steering gear module using an assignment rule, wherein the assignment rule is derived from at least one of a driver profile selection and a roadway state.

* * * * *